(12) United States Patent
Shah et al.

(10) Patent No.: US 9,174,408 B2
(45) Date of Patent: Nov. 3, 2015

(54) MULTILAYERED PACKAGING MATERIAL

(75) Inventors: Bakhtiar Alam Shah, Tinley Park, IL (US); Nitya Prakash Khasat, Newark, DE (US)

(73) Assignee: Winpak Portion Packaging, Sauk Village, IL (US)

( * ) Notice: Subject to any disclaimer, the term of this patent is extended or adjusted under 35 U.S.C. 154(b) by 1102 days.

(21) Appl. No.: 12/802,920

(22) Filed: Jun. 16, 2010

(65) Prior Publication Data

US 2011/0220533 A1 Sep. 15, 2011

Related U.S. Application Data

(63) Continuation-in-part of application No. 12/661,290, filed on Mar. 15, 2010, now abandoned.

(51) Int. Cl.
| | | |
|---|---|---|
| *B32B 1/02* | (2006.01) | |
| *B32B 7/12* | (2006.01) | |
| *B32B 27/08* | (2006.01) | |
| *B32B 27/20* | (2006.01) | |
| *B65D 81/26* | (2006.01) | |

(52) U.S. Cl.
CPC ... *B32B 1/02* (2013.01); *B32B 7/12* (2013.01); *B32B 27/08* (2013.01); *B32B 27/20* (2013.01); *B32B 2250/24* (2013.01); *B32B 2250/40* (2013.01); *B32B 2264/10* (2013.01); *B32B 2307/7244* (2013.01); *B32B 2307/7246* (2013.01); *B65D 81/264* (2013.01)

(58) Field of Classification Search
None
See application file for complete search history.

(56) References Cited

U.S. PATENT DOCUMENTS

| | | | |
|---|---|---|---|
| 4,735,855 A | 4/1988 | Wofford | |
| 4,753,845 A | 6/1988 | Sumi | |
| 4,818,782 A | 4/1989 | Bissot | |
| 4,842,951 A | 6/1989 | Yamada | |
| 4,960,639 A | 10/1990 | Oda | |
| 5,069,946 A | 12/1991 | Moritani | |
| 6,846,533 B2 | 1/2005 | Wu | |
| 6,949,275 B2 | 9/2005 | Johansson | |
| 7,563,399 B2 | 7/2009 | Busch | |
| 2003/0207060 A1* | 11/2003 | Kaschel | 428/35.7 |
| 2004/0028857 A1 | 2/2004 | Johansson | |
| 2005/0186376 A1* | 8/2005 | Rhee et al. | 428/36.9 |
| 2006/0121227 A1 | 6/2006 | Kim | |
| 2007/0197710 A1* | 8/2007 | Wu et al. | 524/445 |
| 2007/0275197 A1 | 11/2007 | Chow | |
| 2008/0145670 A1 | 6/2008 | Song | |
| 2009/0053513 A1 | 2/2009 | Enzinger | |
| 2009/0214722 A1 | 8/2009 | Henze-Wethkamp | |

FOREIGN PATENT DOCUMENTS

WO WO02/24544 3/2002

* cited by examiner

*Primary Examiner* — Samir Shah

(57) ABSTRACT

A multilayered polymeric structure for use as a packaging container comprising a first layer of oxygen barrier material and a second protective layer bonded to the first layer where the oxygen barrier layer material is selected from the group consisting of saponified ethylene-vinyl acetate copolymer, polyamide, polyvinyl alcohol, modification products thereof, and mixtures thereof, and the second protective layer comprises a polymer and an inorganic filler in an amount sufficient to further enhance the moisture barrier property of the outer protective layer over what it would be in the absence of the filler.

4 Claims, 3 Drawing Sheets

MULTILAYERED PACKAGING MATERIAL

PRIORITY DATA

This application is a continuation in part of U.S. application Ser. No. 12/661,290, filed Apr. 6, 2010 and now abandoned, and claims priority in part to that application.

FIELD OF THE INVENTION

This invention relates to a multilayered structure useful for packages, and more particularly relates to a multilayered structure which is capable of retaining an oxygen barrier property satisfactorily in the presence of a high humidity environment such as a retort.

BACKGROUND OF THE INVENTION

Oxygen barrier resins such as saponified ethylene-vinyl acetate copolymer (hereinafter referred to as "EVOH") have low oxygen permeability and yet can be adversely affected by high humidity and are liable to undergo an increase of oxygen permeability under a highly humid atmosphere. Generally, packaging structures are adapted to retain their oxygen barrier property by including a protective layer, such as of a polyolefin or some other barrier polymer having a low water absorption or low moisture absorption on a layer of an oxygen barrier resin of high humidity dependency thereby precluding direct exposure of the oxygen barrier layer to water or moisture.

The dependence of the performance of a packaging structure on humidity is an important property because packages are used to store mammal foodstuffs, generally for humans or pets. Often packages are subjected to a "retort process" in which the molded package/container is subjected to excessive moisture as steam and at elevated temperatures typically around 250° F. (around 130° C.) and the ingress of moisture through the outer protective layers exponentially increases with temperature. This effect leads to lowering of the efficiency of EVOH as the barrier, an effect called "retort shock." Although this lowering is almost a reversible process and the barrier efficiency generally returns almost to its pre shock value, in order to meet the expectations of the shelf life for the food contained in the retorted container the thickness of the EVOH barrier layer must be increased, or lower ethylene mole percent EVOH must be used. These are both expensive alternatives and the most economical way to ensure shelf life is still to protect the EVOH layer from the moisture/steam.

The present inventors have made the unexpected discovery that addition of certain fillers in an effective level to a protective layer results in improved protection of the oxygen barrier component of a packaging structure from moisture.

SUMMARY OF THE INVENTION

The invention is directed to a laminated multilayered sheet structure for use in a packaging container, said structure comprising:
  (i) a first layer of oxygen barrier material having a first surface and an opposing second surface,
  (ii) a protective second layer having a surface that is bonded to at least a portion of the first surface of the first layer in a face to face relationship, and;
  (iii) a protective third layer having a surface that is bonded to at least a portion of the second surface of the first layer in a face to face relationship, The oxygen barrier layer material is selected from the group consisting of saponified ethylene-vinyl acetate copolymer, polyamide, polyvinyl alcohol, and mixtures of the foregoing. The protective second and third layers comprise a moisture barrier polymer and either one or both of the protective layers comprise inorganic filler particles dispersed in the moisture barrier polymer in an amount effective to show an enhancement of the moisture barrier property of the structure over what it would be in the absence of the filler particles. The filler particles have an aspect ratio of 3 or greater. The moisture barrier property enhancement may be measured in one embodiment by the total weight gained by the structure when the structure is subjected to retort shock, which here means exposure to moisture vapor in the form of steam at a temperature of at least 125° C. for at least 33 minutes impinging on the one or both of the filled protective layers, where enhancement means that the amount of moisture absorbed by the structure as measured by the weight gained by the structure is reduced in the presence of filler particles.

The product of the invention may also be directed in another embodiment to a structure that comprises a moisture barrier protective layer or layers as described above, and either one or both of the protective layers comprise inorganic filler particles dispersed in the protective layer or layers in an amount sufficient to show an reduction of the oxygen transmission rate (OTR) of the structure over what it would be in the absence of the filler particles after exposure to steam, for example at a temperature of at least 125° C. for at least 33 minutes as described above. The OTR is measured according to ASTM F-1307 measured on the structure, said method being hereby incorporated here in its entirety by reference. A reduction in the OTR means that after exposure to steam, either the initial OTR after steam treatment, and/or later OTR after sample aging, is lower than it would be in the absence of the filler particles.

In one embodiment, the moisture barrier polymer is selected from the group consisting of polypropylene, polystyrene, high-density polyethylene, medium-density polyethylene, low-density and linear low density polyethylene, polyethylene terephthalate, polybutylene terephthalate, polycarbonates, acrylonitrile-styrene-butadiene copolymer, polyphenylene oxide, modification products and mixtures thereof.

The second layer or the third layer may further comprise a skin layer adjacent to the surface of the second layer or third layer opposite to the first layer. Any of the skin layers may further comprise polyolefins, and the skin layer or layers may be pigmented.

The second layer, the third layer of both may further be bonded to the oxygen barrier (first) layer by an intermediate layer that comprises a polymeric adhesive suitable to bond the first layer to the second and/or third layers. The intermediate polymer layer may comprise a copolymer of ethylene and maleic anhydride.

The filler particles used in the invention may comprise fillers that are selected from the group consisting of talc, calcium carbonate, barium sulfate, wollastonite, mica, clay, kaolin, silica, diatomaceous earth, alumina, zinc white, magnesium oxide, calcium sulfite, calcium sulfate, calcium silicate, glass powders, glass fibers, silane-treated glass fibers, asbestos, gypsum fibers, and combinations thereof. The filler particles further may further comprise a surface coating over at least a portion of its surface.

In a still further embodiment of the structure of the invention, the filler particles are present in an amount from 5% to 50%, or even 10% to 40% by weight of polymer plus filler in the second or third layers or both. All of the filler particles may further have an aspect ratio greater than 3 or even greater than 5. The filler particles, may also have an aspect ratio of between 3 and 120, or even between 5 and 120, or even 3 and 40, or 5 and 40, where the use of the single digits such as "3" and "40" is to be understood herein as meaning "3:1" or "40:1" respectively. The number average aspect ratio of the filler particles may be in one embodiment of the invention greater than 3, or between 3 and 120 or 5 and 120, or even between 3 and 40 or 5 and 40. In a further embodiment at least 10% and preferably at least 30% and even 50% or 70% of the filler particles have an aspect ratio of between 3 and 120 or 5 and 120, or even between 3 and 40 or 5 and 120.

In a still further embodiment the filler particles have a number average particle size in their smallest dimension of between 0.5 and 15 microns or even between 1.5 and 10 microns.

The invention is further directed to a container that comprises a structure according to any of the embodiments described above. For example a container comprising walls in which the walls comprise a multilayered polymeric structure. The structure comprises a first layer of oxygen barrier material and second and third protective layers bonded to the first layer on either side of the first layer. The oxygen barrier layer material is selected from the group consisting of saponified ethylene-vinyl acetate copolymer, polyamide, polyvinyl alcohol, modification products thereof, and mixtures thereof, and the second and third protective layers independently comprise one or more polymers. At least one of the second and third protective layers is a filled protective layer comprising inorganic filler particles as described above, dispersed in the filled protective layer in an amount sufficient to further enhance the moisture barrier property of the filled protective layer over what it would be in the absence of the filler.

The moisture barrier property enhancement of the container may be measured by the total weight gained by the structure when the structure is subjected to moisture vapor in the form of steam at a temperature of at least 125° C. for at least 33 minutes impinging on the one or both of the protective layers with and without filler particles incorporated therein. Enhancement means that the amount of moisture absorbed by the structure as measured by the weight gained by the structure is reduced in the presence of filler particles.

Alternatively the amount of inorganic filler particles required to be dispersed in the moisture barrier polymer may be defined by the amount sufficient to show a reduction of the oxygen transmission rate (OTR) of the package over what it would be in the absence of the filler particles after exposure to steam, for example at a temperature of at least 125° C. for at least 33 minutes. The OTR is measured according to ASTM F-1307 measured on the structure, said method being hereby incorporated here in its entirety by reference. A reduction in the OTR means that after exposure to steam, either the initial OTR after steam treatment, and/or later OTR after sample aging, is lower than it would be in the absence of filler particles.

The invention is further directed to a process for protecting an oxygen sensitive substance comprising the step of enclosing the material in a package. The package comprises a structure according to any of the embodiments described above. For example the multilayer material comprises a first layer of oxygen barrier material and a second protective layer and in one embodiment even a third protective layer bonded to the first layer. The oxygen barrier layer material is selected from the group consisting of saponified ethylene-vinyl acetate copolymer, polyamide, polyvinyl alcohol, modification products thereof, and mixtures thereof, and the second protective layer comprises a polymer and inorganic filler particles as described above, dispersed in the polymer in an amount sufficient to further enhance the moisture barrier property of the filled layer over what it would be in the absence of the filler. The moisture barrier property enhancement may be measured by the total weight gained by the structure when the structure is subjected to moisture vapor in the form of steam at a temperature of at least 125° C. for at least 33 minutes impinging on the one or both of the protective layers with and without filler particles incorporated therein. Enhancement means that the amount of moisture absorbed by the structure as measured by the weight gained by the structure is reduced in the presence of filler particles.

Alternatively the amount of inorganic filler particles required to be dispersed in the protective layer or layers may be defined by the amount effective to show an reduction of the oxygen transmission rate (OTR) of the package over what it would be in the absence of the filler particles after exposure to steam, for example at a temperature of at least 125° C. for at least 33 minutes. The OTR is measured according to ASTM F-1307 measured on the structure, said method being hereby incorporated here in its entirety by reference. A reduction in the OTR means that after exposure to steam, either the initial OTR after steam treatment, and/or later OTR after sample aging, is lower than it would be in the absence of filler particles.

DETAILED DESCRIPTION OF THE INVENTION

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The invention is directed to a laminated multilayer sheet structure that is suitable for protective packaging. The terms "multilayer sheet structure" and "multilayer barrier structure" and "multilayer barrier material" and "multilayer structure" as used herein are synonymous. By "sheet structure" is meant that the structure has two dimensions that are significantly larger than a third, thickness, dimension such that two opposing surfaces of the structure defined by the larger dimensions can be identified. In one embodiment the present invention comprises an oxygen barrier layer in contact with and bonded in face to face contact to at least one protective layer. By "face to face" is meant that one surface of one layer is in contact over at least a portion of the surface with one surface of a second layer.

When used as packaging, the structure will typically have a thickness in the range 0.1 to 10 mm, preferably 0.25 to 5 mm and more preferably 0.25 to 2 mm.

Figure 1:
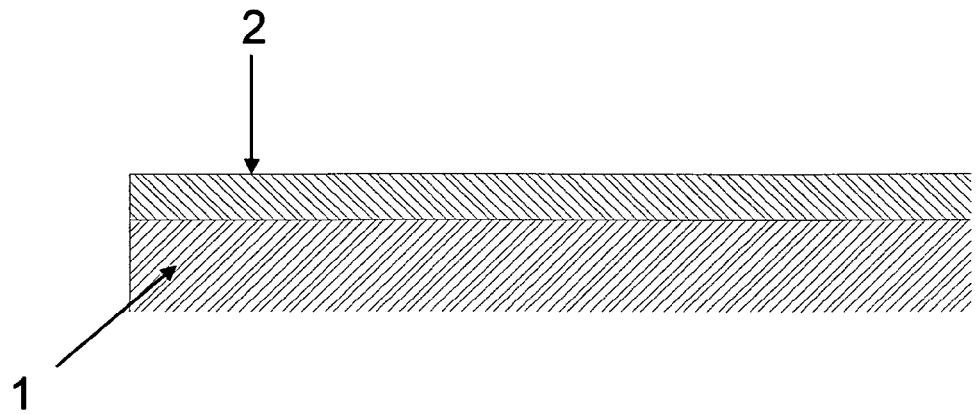
FIG. 1 shows a not to scale representation of a cross section of a two layered embodiment of the present invention.
Figure 2:
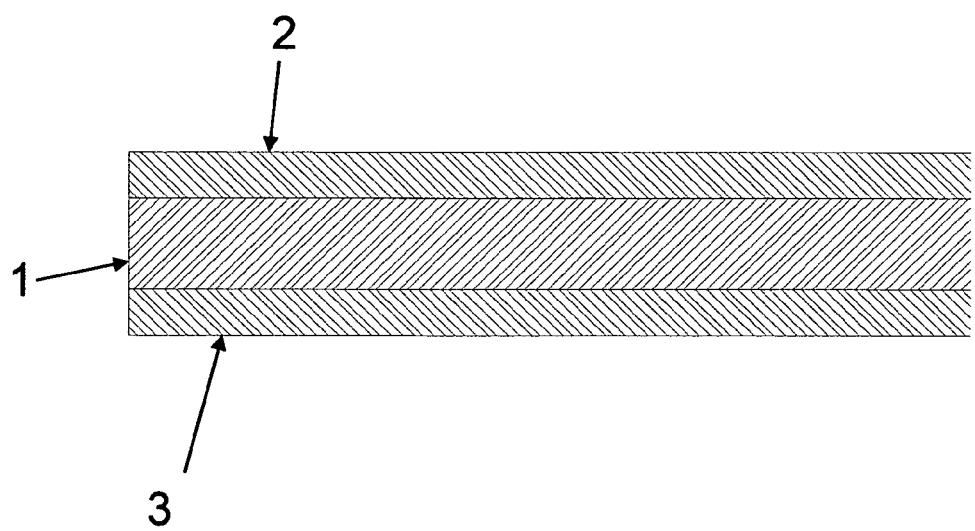
FIG. 2 shows a not to scale representation of a cross section of a three layered embodiment of the present invention.
Figure 3:
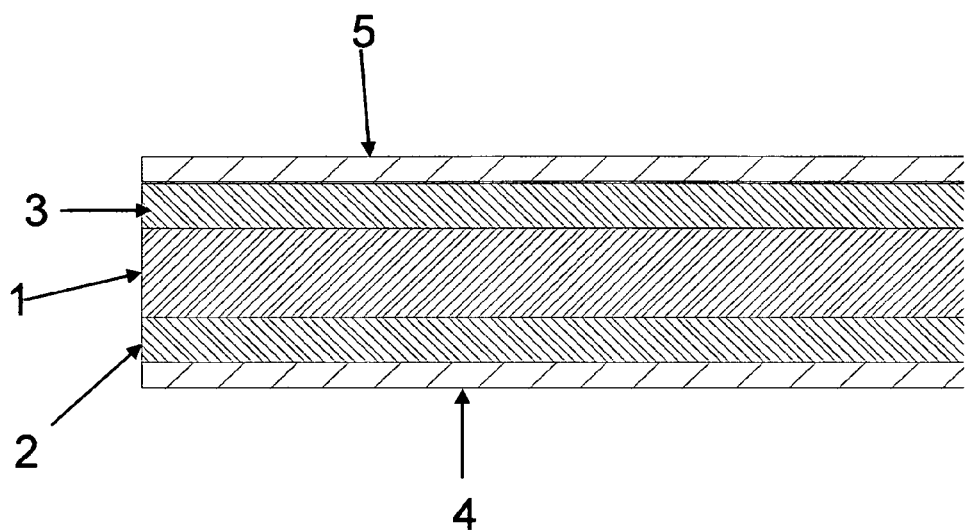
FIG. 3 shows a not to scale representation of a cross section of a five layered embodiment of the present invention.

In the two layer embodiment as shown in FIG. 1, the multilayer sheet structure comprises a oxygen barrier layer (1) and a protective layer (2). The protective layer is in contact with and is bonded to at least a portion, or even to all of the first layer in a face to face relationship. In a three layer embodiment, for example shown figuratively in FIG. 2, the multilayer structure comprises an oxygen barrier layer (1) sandwiched between two protective layers (2) and (3) and bonded to at least a portion, or even to all of their surfaces, in a face to face relationship. The bonding of the oxygen barrier layer and the protective layer or layers can be enabled by use of one or more adhesive layers located in between the layers to be bonded. The protective layers may each also be in contact with and bonded to a further skin layer as shown in FIG. 3. The skin layers (4) and (5) serve to provide a desired surface appearance to the multilayer, or to provide a substrate for any desired pigmentation. Each layer of the multilayer structure will be described in more detail below.

The multilayer structure of the invention can be made by any technology known to one skilled in the art. For example, and without limitation, coextrusion, coinjection molding, or extrusion blow molding are processes that can be uses to fabricate the structure of the invention.

In a preferred embodiment, the invention is therefore directed to a multilayered sheet structure for use in a packaging container, said structure comprising:

(i) a first layer of oxygen barrier material having a first surface and an opposing second surface,
(ii) a protective second layer having a surface that is bonded to at least a portion of the first surface of the first layer in a face to face relationship, and;
(iii) a protective third layer having a surface that is bonded to at least a portion of the second surface of the first layer in a face to face relationship, The second and third layers may be bonded over the entire surface of the oxygen barrier layer to the oxygen barrier layer. The oxygen barrier layer material is selected from the group consisting of saponified ethylene-vinyl acetate copolymer, polyamide, polyvinyl alcohol, and mixtures of the foregoing. The second and third protective layers comprise a moisture barrier polymer and the protective second and third layers comprise a moisture barrier polymer and either one or both of the protective layers comprise inorganic filler particles that have an aspect ratio of greater than or equal to 3 dispersed in the moisture barrier polymer in an amount effective to show an enhancement of the moisture barrier property of the filled protective layer or layers over what it would be in the absence of the filler particles, the moisture barrier property enhancement being measured after a retorting process in which the structure is subjected to moisture vapor in the form of steam at a temperature of at least 125° C. for at least 33 minutes impinging on the one or both of the filled protective layers. The moisture barrier property enhancement may be measured by the total weight gained by the structure after the retorting process. Enhancement in that context means that the amount of moisture absorbed by the structure as measured by the weight gained by the structure is reduced in the presence of filler particles.

The moisture barrier property enhancement may also be measured by measuring the oxygen transmission rate (OTR) of the structure or a container made from the structure. The OTR can be measured by any method known to one skilled in the art, for example the OTR may be measured according to ASTM F-1307 measured on the structure, said method being hereby incorporated here in its entirety by reference. The product of the invention may therefore be directed to a structure as described above that comprises one or two protective layers and either one or both of the protective layers comprise inorganic filler particles dispersed in the protective layer in an amount sufficient to show an enhancement of the oxygen transmission rate (OTR) property of the filled protective layer or layers over what it would be in the absence of the filler particles after exposure of the structure to a retorting process in which steam impinges on a protective layer. An enhancement in the OTR means that after exposure to steam, either the initial OTR immediately after, or within 24 hours or less, of steam treatment, or the later OTR after sample aging for 24 hours or more, is lower than it would be in the absence of filler particles.

Oxygen Barrier Layer

Examples of the material for this layer include saponified ethylene-vinyl acetate copolymers, polyamides, polyvinyl alcohol, modification products and mixtures thereof. Among the materials enumerated above, the saponified ethylene-vinyl acetate copolymer having an ethylene content in the range of 25 to 50 mol % and a saponification degree of not less than 96% is a preferred embodiment. By increasing the ethylene content beyond 25 mol %, the molding properties, for example in extrusion molding and blow molding, are improved. By holding down the ethylene content below 50 mol %, the oxygen barrier property is enhanced.

The oxygen barrier layer (1) can also be made of multiple extruded layers of the same or different barrier materials. In an example of this structure, the barrier layer will be extruded from a multilayer die and the resulting extrudate bonded into a single layer, preferably by application of pressure and heat.

Protective Layers

Examples of the material use in the construction of these layers include homo and copolymers from the family of polypropylene resins, polystyrene and rubber modified polystyrene, linear and branched polyethylenes regardless of the resin density (for example high-density of density above 0.94, medium-density polyethylene of density above 0.92 to 0.94, and low-density and linear low density polyethylene of density 0.92 and below), polyethylene terephthalate, polybutylene terephthalate, polycarbonates, acrylonitrile-styrene-butadiene copolymer, modification products and mixtures thereof. The polymer used for the protective layer is not limited, however, and, for example, nylon (polyamide) can also be used in this application.

If there is more than one protective layer in the structure, then at least one of the protective layers has filler particles incorporated therein and dispersed in the polymer, in an amount effective to increase the moisture barrier property of the structure or to reduce the oxygen transmission rate of the structure after moisture exposure when compared to a structure that has no filler particles in either protective layer. For example, in a two layer structure, the protective layer will have filler incorporated therein. In a three layer structure as described above, one or both of the protective layers will have filler incorporated therein.

The filled polymer layer of the structure may be formed by direct compounding and extrusion of a polymer with at least one particulate mineral filler, for example, using a twin screw extruder. Whatever the process by which the filler is incorporated into the polymer, examples of particulate mineral fillers that may be used include, but are not limited to, talc, calcium carbonate, barium sulfate, wollastonite ($Ca_3(Si_3O_9)$), mica, clay, kaolin or combinations thereof. For example, the filled polymer layer may comprise talc and polypropylene. A protective layer comprising at least one particulate mineral filler and polymer as claimed here in combination with the oxygen barrier layer of the invention provides much improved moisture resistance and hence protection of the oxygen barrier layer as compared to a non-filled neat protective layer in combination with the oxygen barrier layer.

Commercially available talc materials include MICROTUFF® 121, Stellar 510 available from Specialty Minerals of New York, N.Y., and JETFILL® 675C, Jetfil T590, 8230, available from Luzenac America of Englewood, Colo. Commercially available barium sulfate includes Barite 1075, available from Polar Minerals, Atlanta, Ga. Commercially available wollastonite may be obtained from NYCO, Calgary, Alberta, Canada. Commercially available mica materials include ALBASHIELD® 15, available from Zemex Industrial Minerals, Inc.

It is contemplated that other additives may be added to the protective layer or layers if used. For example, titanium dioxide ($TiO_2$) may be added the polymer layer to provide a whitening effect. Other additives, such as other pigments, may be added to the substrate. The layer may also include recycled material, either post consumer or manufacturing scrap, for example.

Other examples of fillers to be used in the present invention are not particularly limited to the above, and include inorganic fillers, such as silica, diatomaceous earth, alumina, zinc white, magnesium oxide, calcium sulfite, calcium sulfate, calcium silicate, glass powders, glass fibers (inclusive of silane-treated glass fibers), asbestos, gypsum fibers, and the like.

These fillers may be used either individually or, if desired, in combination thereof. In view of a favorable balance between moisture resistance and other properties of the resulting composition, talc and/or mica are preferably used as fillers.

The filler used in the invention may also be coated. In accordance with one aspect of the invention, surface treatment of the fillers, in particular those which are hydrophilic, includes reaction of the filler surface with organosilanes, modified oligomers and a wide variety of surfactants. Typically, the entire surface of the filler is treated with surfactant.

The filler-containing polymer composition of the protective layer or layers of the present invention contains from 5 to 50% by weight, and preferably from 10 to 40% by weight, of the above-described filler.

Further, it is possible to add to the polymer composition in any layer of the structure of the invention appropriate amounts of various additives, such as antioxidants, weathering agents, antistatic agents, foaming agents, colorants, and the like.

The method of preparing the polymer plus filler composition of the present invention is not particularly restricted. Kneading machines commonly employed for plastics or rubbers, such as a Banbury mixer, a single-screw extruder, a twin-screw extruder, a roll mill, etc., can be used. The resulting blended composition can be molded into desired molded products by thermoforming extruded sheet or film, injection molding, extrusion molding, blow molding, etc. in a manner known to one skilled in the art. Filler can be compounded in the carrier resin off or in line with the sheet extrusion process.

The filler can comprise entirely a high aspect ratio filler or a mixture of high and low aspect ratio fillers. The term "aspect ratio" of a particle is defined herein as a ratio of a largest dimension of the particle divided by a smallest dimension of the particle. The aspect ratios can be determined by scanning under an electron microscope and visually viewing the outside surfaces of the particles to determine the lengths and thicknesses of the particles. The use of single digits and the use of two digits to describe aspect ratio herein are synonymous. For example the terms "5:1" and "5" both have the same meaning.

All of the filler particles may further have an aspect ratio of between 3 and 120 or 5 and 120 or 10 and 120, or even between 3 and 40 or 5 and 40 or 10 and 40. The number average aspect ratio of the filler particles may further have an aspect ratio of between 3 and 120 or 5 and 120 or 10 and 120, or even between 3 and 40 or 5 and 40 or 10 and 40. In a further embodiment at least 10% and preferably at least 30% and even 50% or 70% of the filler particles have an aspect ratio of between 3 and 120 or 5 and 120 or 10 and 120, or even between 3 and 40 or 5 and 40 or 10 and 40.

There is no particular limitation to the upper limit of the number average aspect ratio. The inventors have discovered that high aspect ratio fillers are particularly effective when included in at least one protective layer of the present invention. A high aspect ratio filler is defined herein as a filler having an aspect ratio of at least about 3:1. The high aspect ratio fillers of the present invention may have, for example, preferably have an aspect of from about 3:1 to about 100:1, and more preferably from about 10:1 to about 50:1. The high aspect filler may for example be talc, mica, wollastonite, or combinations thereof. Commercially available talc materials include JETFIL® 575, available from Luzenac America of Englewood, Colo. Commercially available mica materials include SUZOREX® 325-PP, available from Zemex Industrial Minerals, Inc. Commercially available wollastonite include the NYGLOS® series of wollastonite, available from NYCO Minerals Inc. of Calgary, Alberta, Canada.

A low aspect ratio filler is defined as being a filler having an aspect ratio of from 1:1 to about 3:1 and such fillers can also be used in the structure of the invention in combination with high aspect ratio fillers. Examples of low aspect ratio fillers may include calcium carbonate, barium sulfate, or combinations thereof. Commercially available calcium carbonate includes OMYACARB FT®, available from OMYA Inc. of Alpharetta, Ga. One example of commercially available barium sulfate is BARITE 2075®, available from Polar Minerals in Mentor, Ohio.

There is no particular limit on the size of the filler particles used in the present in the invention, except that they be effective at reducing moisture permeability of the protective layer or layers. The fillers used in the present invention preferably have a number average smaller dimension of between 0.5 microns and 50 microns, and more preferably from 1.5 microns to 10 microns.

Adhesive Layer

This layer bonds the oxygen barrier layer to the protective layer or layers as described above. Examples of the material for this layer include polar group-containing modified polyolefins obtained by graft modifying polyethylene, polypropylene, or ethylene-vinyl acetate copolymer with unsaturated carboxylic acids, or unsaturated polycarboxylic acids or anhydrides thereof; ethylene-vinyl acetate copolymer and saponification products thereof; ethylene-ethylacrylate copolymer, ethylene-acrylic acid copolymer, ethylene-methacrylic acid copolymer, ionomers obtained by cross-linking such copolymers with metallic ions; and block copolymers of styrene with butadiene. These are preferably synthetic resins compatible with synthetic resins used for forming the oxygen barrier layer and the protective layers.

Containers

The present invention is also directed to a container that is constructed using the multilayer sheet structure of the invention as described above as a wall of the container. A container will generally comprise a lid and a body, where the body is constructed of walls. The lid can be constructed of the multilayer barrier construction disclosed herein, or metal or any suitable barrier material. The body of the container comprises a wall or walls that are constructed according to the multilayer barrier material structure or structures described above.

For example, in one embodiment of the container of the invention the outside and inside walls of the container will generally comprise over at least a part of their surfaces a pigmented skin that is between 0 to 25% of the thickness of the container wall. The skin is bonded to a protective layer. At least one, and preferably both, of the protective layers in the container wall comprise filler or fillers as described above. The protective layers then comprise 5 to 40% of the thickness of the container wall.

An oxygen barrier layer, preferably EVOH, comprises 1 to 10% of the thickness of the container wall. Adhesive layers as described above bond the oxygen barrier layer to at least one and preferable two protective layer or layers. In this embodiment the adhesive layer constitutes 1 to 5% of the thickness of the container.

The pigmented skin is preferably a polyolefin or a blend of several polyolefins, the term "polyolefin" being as understood by one skilled in the polymer arts as being a polymer of an unsaturated hydrocarbon (olefin.) the pigmented skin contains pigment to provide the desired coloration for the multilayer surface, and one skilled in the art will be able to easily identify appropriate pigments for use in this application. At least one of the protective layers is filled as described in the barrier structure above and comprises a polymer, filler particles as described above, and optionally regrind or recycled materials. The container may be made by a thermoforming or molding process, but any process known to one skilled in the art will suffice to make the container.

The adhesive layer is preferably a functionalized extrudable thermoplastic resin, e.g., maleated or otherwise functionalized olefins. One skilled in the art will understand what resin may be used to compatibilize the oxygen barrier and the protective layer. In some cases mineral filler can be added to the outer skin layers or these layers can be eliminated.

The container of the invention can be manufactured by thermoforming. Thermoforming of polyolefins, for example, is well known. Generally, a sheet of the polyolefin is formed or shaped by heating the sheet above the softening temperature of the polyolefin, fitting the sheet along the contours of a mold with pressure supplied by vacuum or other force, and removing the shaped article from the mold after cooling below its softening point.

Thermoforming methods such as vacuum forming or plug-assist vacuum forming are often useful in packaging products. In general terms, thermoforming involves heating of a thermoplastic film or laminate and forming the film or laminate into a desired shape for holding a product to be inserted. This sheet of a film or laminate is usually referred to as a forming web. Various systems and devices are used in a thermoforming process, often accompanied by vacuum-assist and plug-assist components to provide the proper forming of the forming web into a predetermined shape.

A packaging container according to the present invention may therefore comprise a container formed by deforming a multilayer sheet as described above according to a thermoforming method, and a lid made of a resin or of a metal or of another suitable barrier material and adapted for sealing the holding container.

The container can also be formed by other methods, for example and not limited to, coinjection molding, extrusion blow molding, laminated sheet thermoforming, and any other method known to one skilled in the art.

Method for Protecting Substances

The invention is also directed to a method for protecting an oxygen sensitive substance, such as a foodstuff, comprising the step of enclosing the material in a package. The package comprises a laminated multilayer sheet structure according to any of the embodiments that are described above. For example in one embodiment the multilayer material comprises a first layer of oxygen barrier material and a second protective layer bonded to the first layer. The oxygen barrier layer material is selected from the group consisting of saponified ethylene-vinyl acetate copolymer, polyamide, polyvinyl alcohol, modification products thereof, and mixtures thereof, and the second protective layer comprises a protective polymer and an inorganic filler dispersed in the polymer in an amount effective to further enhance the moisture barrier property of the outer protective layer over what it would be in the absence of the filler. The moisture barrier property enhancement may be measured by the total weight gained by the structure when the structure is subjected to moisture vapor in the form of steam at a temperature of at least 125° C. for at least 33 minutes impinging on the one or both of the protective layers with and without filler particles incorporated therein. Enhancement means that the amount of moisture absorbed by the structure as measured by the weight gained by the structure is reduced in the presence of filler particles.

The process of the invention may also be directed in another embodiment to a use of a laminated multilayer sheet structure as described above that comprises a moisture barrier protective layer or layers as described above, and either one or both of the protective layers comprise inorganic filler particles dispersed in the protective layer or layers in an amount effective to show an reduction of the oxygen transmission rate (OTR) of the structure over what it would be in the absence of the filler particles after exposure to steam, for example at a temperature of at least 125° C. for at least 33 minutes. The OTR is measured according to ASTM F-1307 measured on the structure, said method being hereby incorporated here in its entirety by reference. A reduction in the OTR means that after exposure to steam, either the initial OTR after steam treatment, and/or later OTR after sample aging, is lower than it would be in the absence of the filler particles.

The protective polymer of the process may for example be selected from the group consisting of polypropylene, polystyrene, high-density to medium-density polyethylenes, low-density polyethylene, polyethylene terephthalate, polybutylene terephthalate, polycarbonates, acrylonitrile-styrene-butadiene copolymer, polyphenylene oxide, modification products and mixtures thereof.

The process of the invention may also utilize a laminated multilayer structure that further comprises a protective third layer bonded to the first layer in a face to face relationship and to the surface of the first layer opposite to that bonded to the second layer. The protective layers may also further have skin layers as described above bonded to them on the faces opposite to the first layer. The skin layers on the second and third layers may comprise polyolefins.

The filler used in the protective layer of the process may be selected from the group consisting of talc, calcium carbonate, barium sulfate, wollastonite, mica, clay, kaolin, silica, diatomaceous earth, alumina, zinc white, magnesium oxide, calcium sulfite, calcium sulfate, calcium silicate, glass powders, glass fibers, silane-treated glass fibers, asbestos, gypsum fibers, and combinations thereof. The filler may further comprise a surface coating over at least a portion of its surface. The filler may be present in an amount from 5% to 50% or even 10% to 40% by weight of polymer plus filler in the outer layer.

The filler particles may have an aspect ratio of between 3 and 120, and even between 3 and 40. All of the filler particles may further have an aspect ratio of between 3 and 120, or even between 3 and 40. The number average aspect ratio of the filler particles may further be between 3 and 120, or even between 3 and 40. In a further embodiment at least 10% and preferably at least 30% and even 50% or 70% of the filler particles have an aspect ratio of between 3 and 120, or even between 3 and 40.

The filler particles may also have a number average particle size in their smallest dimension of between 0.5 and 15 microns, even between 1.5 and 10 microns.

EXAMPLES

Example 1

Sheet according to the design of FIG. 3 was produced on a 5 layer coextrusion line with the following structure:
(i) Talc filled polypropylene (PP)
(ii) Adhesive
(iii) Ethylene vinyl alcohol polymer (EVOH)
(iv) Adhesive
(v) Talc filled PP.

The polypropylene was a virgin homopolymer of melt flow (MF) 4.0. The adhesive was a maleic anhydride grafted polypropylene. The EVOH used in this study was produced by Soarus (Arlington Heights, Ill.) Talc masterbatch was obtained from Rainmaker Polymers (Warsaw, Ind.) and was 45% talc compounded in polypropylene homo polymer. The specific talc used was BT9103 produced by Specialty Minerals (Bethlehem, Pa.) Particle size was number average 3 microns. Average aspect ratio was 8:1. The base resin for the talc masterbatch was a homopolymer polypropylene of 4.0 melt flow rate. A control sample was also prepared that had no talc in the PP protective layers.

Total layer thicknesses were nominally 45 mils (1.14 mm). EVOH was 2% of that (0.0009 inches) and adhesive layers were also 2% each. The remaining 94% of the total thickness was PP split evenly between the two protective layers. Containers were thermoformed from the sheet and weighed. Steaming was carried out by placing containers in a chamber and subjected to steam at 257° F. (125° C.) for 33 minutes, dried with a towel to remove surface moisture then weighed again to represent initial weight after steaming.

This example shows the effect of adding talc to the outer layer structures on the weight gain in the retort. The table below shows the reduced water uptake obtained with the filled protective layer over the control material with no talc.

| Talc content (weight % per total weight of PP + talc in layers (i) and (v)) | Initial Weight Gain (g) |
|---|---|
| 0 | 0.0186 |
| 30 | 0.0147 |
| 35 | 0.0137 |

Example 2

In example 2, below, a 0.045 inch (1.14 mm) thick multilayer sheet was extruded with following seven layer structure:
(i) Outer layer of virgin PP (5% of thickness of sheet.)
(ii) Protective layer of regrind (50% by weight of core)+ Talc (BT9103) masterbatch+virgin PP (41% by weight of core) 30% talc in overall total multilayered structure as measured by TGA.
(iii) Maleic anhydride grafted PP adhesive (2% of thickness of sheet.)
(iv) EVOH (5% of thickness of the total sheet width.)
(v) Maleic anhydride grafted PP Adhesive (2% of thickness of sheet.)
(vi) Protective layer of regrind (50% by weight of core)+ Talc masterbatch+virgin PP (41% by weight of core)
(vii) Outer layer of virgin PP (5% of thickness of sheet.)

The talc masterbatch contained 45% talc and 55% homopolymer PP. Composition of the Core layers was adjusted to achieve 30% talc concentration in the overall structure measured by Thermo Gravometric Analysis (TGA).

Figure 4:
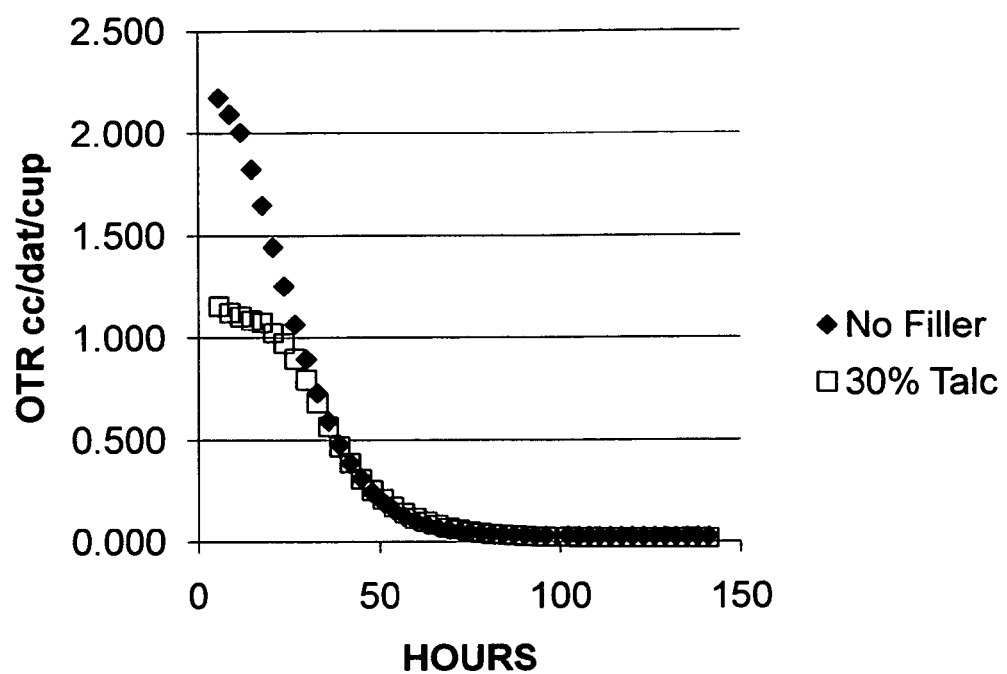
FIG. 4 shows a plot of oxygen transmission rate for samples prepared according to the invention and control samples with no filler.

Oxygen transmission rate was measured on containers from example 2 and the control that were placed on a Mocon 2/21 (Mocon Inc., Minneapolis, Minn.) for 10 days according to ASTM F-1307, hereby incorporated in its entirety by reference. (Mocon Inc., Minneapolis, Minn.) FIG. 4 shows the results of the oxygen transmission rate (OTR) testing. The transmission rate in the talc filled sample has an OTR that is approximately half that of the unfilled sample after retort, or steam treatment. The OTR therefore can also be seen from these results and the results from example 1 to correlate with moisture uptake. The calcium carbonate sample showed an initial OTR that was similar to the unfilled sample, but then recovered more quickly to a lower OTR than the unfilled sample.

These results show the effectiveness of the filled samples at lowering OTR after resort shock, and in particular the effectiveness of the sample containing filler of aspect ratio higher than 1.

We claim:
1. A laminated multilayered sheet structure for use in a packaging container, said structure comprising:
(i) a first layer of oxygen barrier material having a first surface and an opposing second surface,
(ii) a protective second layer having a surface that is bonded to at least a portion of the first surface of the first layer in a face to face relationship, and:
(iii) a protective third layer having a surface that is bonded to at least a portion of the second surface of the first layer in a face to face relationship,
where the oxygen barrier layer material is selected from the group consisting of saponified ethylene-vinyl acetate copolymer, polyamide, polyvinyl alcohol, and mixtures of the foregoing, and the protective second and third layers comprise a moisture barrier polymer and either one or both of the protective layers comprise inorganic filler particles that have an aspect ratio of greater than or equal to 3 and a number average particle size in their smallest dimension of between 0.5 and 15 microns, dispersed in the moisture barrier polymer in an amount effective to show an enhancement of the moisture barrier property of the structure over what it would be in the absence of the filler particles, the moisture barrier property enhancement being measured after a retorting process in which the structure is subjected to moisture vapor in the form of steam at a temperature of at least 125° C. for at least 33 minutes impinging on the one or both of the filled protective layers and the moisture barrier property enhancement is measured by the value of oxygen transmission rate reached by the structure initially after the retorting process and where enhancement means that the oxygen transmission rate in the presence of particles is less than that in the absence of particles.

2. The structure of claim 1 in which the filler particles have a number average particle size in their smallest dimension of between 1.5 and 10 microns.

3. The structure of claim 1 in which the filler particles are present at a level of 5 to 50% by weight of the protective layer.

4. The structure of claim 3 in which the filler particles are present at a level of between 10% and 40% by weight of the protective layer.

* * * * *